(12) United States Patent
Nefian

(10) Patent No.: US 7,209,883 B2
(45) Date of Patent: Apr. 24, 2007

(54) FACTORIAL HIDDEN MARKOV MODEL FOR AUDIOVISUAL SPEECH RECOGNITION

(75) Inventor: Ara V. Nefian, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 10/142,447

(22) Filed: May 9, 2002

(65) Prior Publication Data

US 2003/0212556 A1    Nov. 13, 2003

(51) Int. Cl.
*G10L 15/00* (2006.01)
*G10L 15/04* (2006.01)
*G10L 15/14* (2006.01)
*G06K 9/00* (2006.01)

(52) U.S. Cl. .................. 704/256; 704/251; 704/256.2; 704/244; 382/115; 382/118

(58) Field of Classification Search ............... 704/271, 704/256, 235, 251, 256.2, 244; 382/115, 382/118

See application file for complete search history.

(56) References Cited

U.S. PATENT DOCUMENTS

| | | | |
|---|---|---|---|
| 5,454,043 A | 9/1995 | Freeman | |
| 5,596,362 A | 1/1997 | Zhou | |
| 5,710,590 A | 1/1998 | Ichige et al. | |
| 5,754,695 A | 5/1998 | Kuo et al. | |
| 5,887,069 A | 3/1999 | Sakou et al. | |
| 6,024,852 A | 2/2000 | Tamura et al. | |
| 6,072,494 A | 6/2000 | Nguyen | |
| 6,075,895 A | 6/2000 | Qiao et al. | |
| 6,108,005 A | 8/2000 | Starks et al. | |
| 6,128,003 A | 10/2000 | Smith et al. | |
| 6,184,926 B1 | 2/2001 | Khosravi et al. | |
| 6,185,529 B1 * | 2/2001 | Chen et al. .................. | 704/251 |
| 6,191,773 B1 | 2/2001 | Maruno et al. | |
| 6,212,510 B1 | 4/2001 | Brand | |
| 6,215,890 B1 | 4/2001 | Matsuo et al. | |
| 6,222,465 B1 | 4/2001 | Kumar et al. | |

(Continued)

FOREIGN PATENT DOCUMENTS

| | | |
|---|---|---|
| WO | WO 00/36845 | 6/2000 |
| WO | WO 00/009218 A1 | 1/2003 |

OTHER PUBLICATIONS

Dupont et al., Audio-Visual Speech Modeling for Continuous Speech Recognition, Sep. 2000, IEEE Transactions on Multimedia, vol. 2, No. 3, pp. 141-151.*

(Continued)

*Primary Examiner*—David Hudspeth
*Assistant Examiner*—James S. Wozniak
(74) *Attorney, Agent, or Firm*—Blakely, Sokoloff, Taylor & Zafman LLP

(57) ABSTRACT

A speech recognition method includes use of synchronous or asynchronous audio and a video data to enhance speech recognition probabilities. A two stream factorial hidden Markov model is trained and used to identify speech. At least one stream is derived from audio data and a second stream is derived from mouth pattern data. Gestural or other suitable data streams can optionally be combined to reduce speech recognition error rates in noisy environments.

17 Claims, 4 Drawing Sheets

U.S. PATENT DOCUMENTS

| | | | |
|---|---|---|---|
| 6,304,674 | B1 | 10/2001 | Cass et al. |
| 6,335,977 | B1 | 1/2002 | Kage |
| 6,385,331 | B2 | 5/2002 | Harakawa et al. |
| 6,609,093 | B1 | 8/2003 | Gopinath et al. |
| 6,624,833 | B1 | 9/2003 | Kumar et al. |
| 6,678,415 | B1 | 1/2004 | Popat et al. |
| 6,751,354 | B2 | 6/2004 | Foote et al. |
| 6,816,836 | B2 * | 11/2004 | Basu et al. ............. 704/270 |
| 6,952,687 | B2 | 10/2005 | Andersen et al. |
| 6,964,023 | B2 | 11/2005 | Maes et al. |
| 2002/0102010 | A | 8/2000 | Liu et al. |
| 2002/0140718 | A | 10/2000 | Yan et al. |
| 2002/0036617 | A1 | 3/2002 | Pryor |
| 2002/0093666 | A1 | 7/2002 | Foote et al. |
| 2002/0135618 | A1 | 9/2002 | Maes et al. |
| 2002/0161582 | A1 | 10/2002 | Basson et al. |
| 2003/0123754 | A1 | 7/2003 | Toyama |
| 2003/0144844 | A1 | 7/2003 | Colmenarez et al. |
| 2003/0154084 | A1 | 8/2003 | Li et al. |
| 2003/0171932 | A1 | 9/2003 | Juang |
| 2003/0190076 | A1 | 10/2003 | DeLean |

OTHER PUBLICATIONS

Potamianos et al., An Image Transform Approach for HMM Based Automatic Lipreading, Proc. Int. Conf. Image Processing, 1998.*

Potamainos et al., IEEE Workshop on Multimedia Processing, Dec. 1998.*

Chan, HHH-Based Audio-Visual Speech Recognition Integrating Geometric and Appearance-Based Visual Features, IEEE 2001.*

Hennecke et al., Automatic Speech Recognition System Using Acoustic and Visual Signals, IEEE 1996.*

Logan et al, "Factorial Hidden Markov Models for Speech Recognition", Cambridge Research Laboratory, Sep. 1997, pp. 1-14.*

Neti et al, "Large-vocabulary Audio-visual Speech Recognition: A Summary of the Johns Hopkins Summer 2000 Workshop," In Proc. IEEE Workshop Multimedia Signal Processing, pp. 619-624, Cannes, France, 2001.*

Dugad: Tutorial on Hidden Markov Models; Technical Report No. SPANN-96, May 1996, pp. 1-16.

Brand: Coupled Hidden Markov Models for Modeling Interacting Processes; Learning and Common Sense Technical Report 405, Jun. 3, 1997, MIT Media Lab Perceptual Computing, USA, pp. 1-28.

Nefian et al: An Embedded HMM-Based Approach for Face Detection and Recognition; Proceedings of the IEEE Int'l Conference on Acousincs, Speech and Signal Processing, Mar. 15-19, 1999, IEEE, Mar. 15, 1999, pp. 3553-3556, USA.

Nefian: Embedded Bayesian Networks for Face Recognition; IEEE In'tl Conference on Multimedia and Expo; IEEE vol. 2, Aug. 26, 2002, pp. 133-136.

Kennedy, et al: Identification of Coupled Markov Chain Model with Application; Proceedings of the 31st IEEE Conference on Decision and Control, Dec. 16-18, 1992; vol. 4, pp. 3529-3534.

Ramesh, et al: Automatic Selection of Tuning Parameters for Feature Extraction Sequences; Proceedings IEEE Computer Society Conference on Computer vision and Pattern Recognition; Jun. 21-23, 1994, pp. 672-677.

Liang, et al: Speaker Independent Audio-Visual Continuous Speech Recognition; Aug. 2002; Multimedia and Expo, vol. 2, pp. 25-28; IEEE.

PCT/US 03/31454 Int'l Search Report dated Mar. 1, 2004.

U.S. Appl. No. 10/269,333, filed Oct. 11, 2002 Office Action dated Jan. 20, 2006.

U.S. Appl. No. 10/269,381, filed Jan. 6, 2003 Office Action dated OA Mar. 3, 2006.

U.S. Appl. No. 10/269,333, filed Oct. 11, 2002 Final Office Action dated May 16, 2006.

U.S. Appl. No. 10/143,459, filed May 9, 2002 Office Action dated May 23, 2006.

U.S. Appl. No. 10/269,381, filed Jan. 6, 2003 Final Office Action dated Jul. 11, 2006.

U.S. Appl. No. 10/142,468, filed May 9, 2002 Office Action dated Aug. 2, 2005.

U.S. Appl. No. 10/142,468, filed May 9, 2002 Office Action dated Mar. 1, 2006.

Int'l Application No.: PCT/US03/31454 Written Opinion dated Oct. 12, 2006.

Pending U.S. Appl. No.: 10/143,459 filed May, 9 2002, inventor: Lu Hong Liang; Final Office Action dated Oct. 31, 2006.

Wikipedia: Definition of Linear Discriminant Analysis.

* cited by examiner

FACTORIAL HIDDEN MARKOV MODEL FOR AUDIOVISUAL SPEECH RECOGNITION

FIELD OF THE INVENTION

The present invention relates to speech recognition systems. More specifically, this invention relates to factorial hidden Markov model techniques for evaluating audiovisual material.

BACKGROUND

Commercial speech recognition systems that primarily use audio input are widely available, but often underutilized because of reliability concerns. Such conventional audio systems are adversely impacted by environmental noise, often requiring acoustically isolated rooms and consistent microphone positioning to reach even minimally acceptable error rates in common speech recognition tasks. The success of the currently available speech recognition systems is accordingly restricted to relatively controlled environments and well defined applications such as dictation or small to medium vocabulary voice-based control commands (hand free dialing, menu navigation, GUI screen control). These limitations have prevented the widespread acceptance of speech recognition systems in acoustically uncontrolled workplace or public sites.

In recent years, it has been shown that the use of visual information together with audio information significantly improve the performance of speech recognition in environments affected by acoustic noise. The use of visual features in conjunction with audio signals takes advantage of the bimodality of the speech (audio is correlated with lip position) and the fact that visual features are invariant to acoustic noise perturbation.

Various approaches to recovering and fusing audio and visual data in audiovisual speech recognition (AVSR) systems are known. One popular approach relies on mouth shape as a key visual data input. Unfortunately, accurate detection of lip contours is often very challenging in conditions of varying illumination or during facial rotations. Alternatively, computationally intensive approaches based on gray scale lip contours modeled through principal component analysis, linear discriminant analysis, two-dimensional DCT, and maximum likelihood transform have been employed to recover suitable visual data for processing.

Fusing the recovered visual data with the audio data is similarly open to various approaches, including feature fusion, model fusion, or decision fusion. In feature fusion, the combined audiovisual feature vectors are obtained by concatenation of the audio and visual features, followed by a dimensionality reduction transform. The resultant observation sequences are then modeled using a hidden Markov model (HMM) technique. In model fusion systems, multi-stream HMM using assumed state synchronous audio and video sequences is used, although difficulties attributable to lag between visual and audio features can interfere with accurate speech recognition. Decision fusion is a computationally intensive fusion technique that independently models the audio and the visual signals using two HMMs, combining the likelihood of each observation sequence based on the reliability of each modality.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
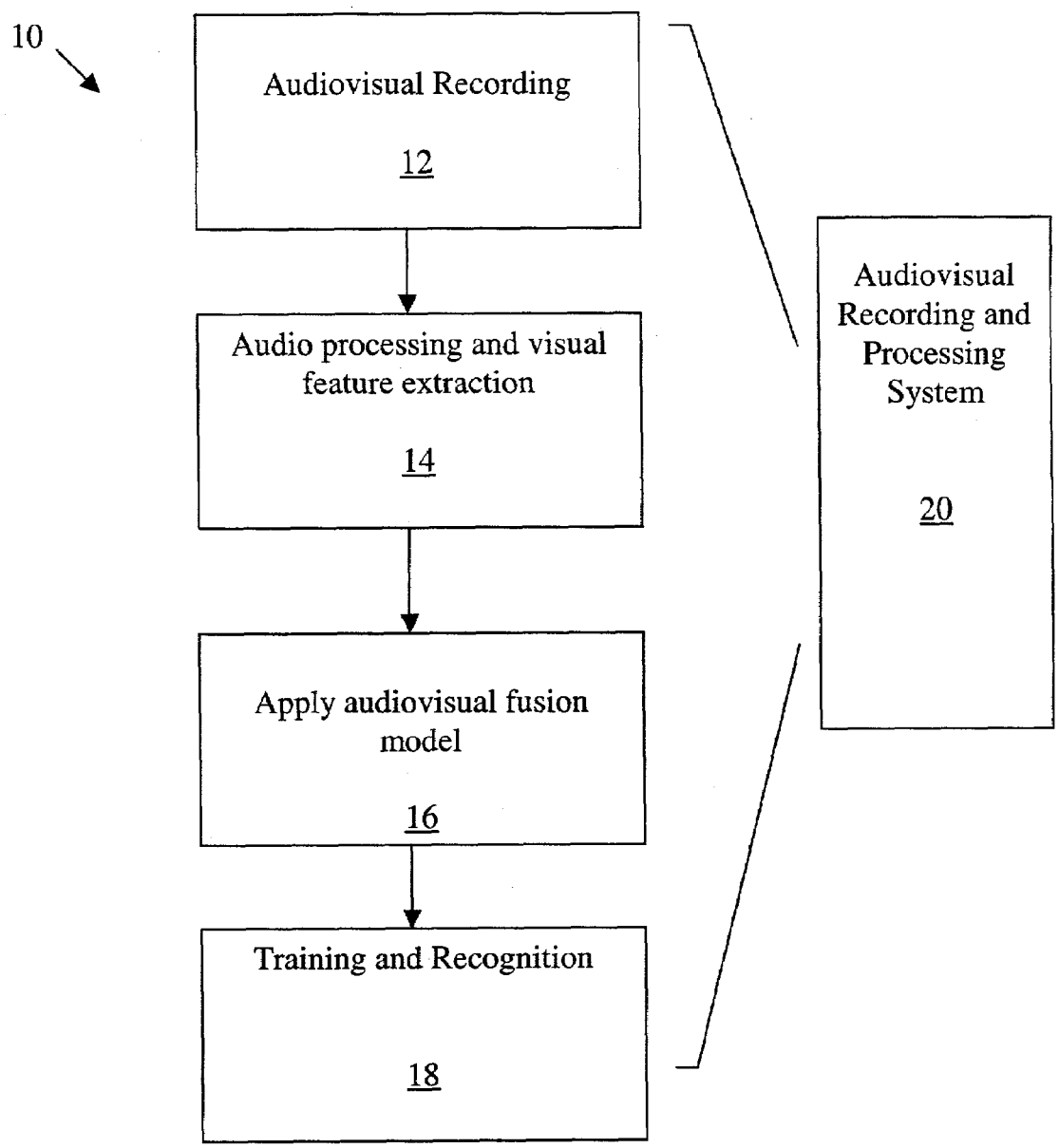
FIG. 1 generically illustrates a procedure for audiovisual speech recognition.

As seen with respect to the block diagram of FIG. 1, the present invention is a process 10 for audiovisual speech recognition system capable of implementation on a computer based audiovisual recording and processing system 20. The system 20 provides separate or integrated camera and audio systems for audiovisual recording 12 of both facial features and speech of one or more speakers, in real-time or as a recording for later speech processing. Audiovisual information can be recorded and stored in an analog format, or preferentially, can be converted to a suitable digital form, including but not limited to MPEG-2, MPEG-4, JPEG, Motion JPEG, or other sequentially presentable transform coded images commonly used for digital image storage. Low cost, low resolution CCD or CMOS based video camera systems can be used, although video cameras supporting higher frame rates and resolution may be useful for certain applications. Audio data can be acquired by low cost microphone systems, and can be subjected to various audio processing techniques to remove intermittent burst noise, environmental noise, static, sounds recorded outside the normal speech frequency range, or any other non-speech data signal.

In operation, the captured (stored or real-time) audiovisual data is separately subjected to audio processing and visual feature extraction 14. Two or more data streams are integrated using an audiovisual fusion model 16, and training network and speech recognition module 18 are used to yield a desired text data stream reflecting the captured speech. As will be understood, data streams can be processed in near real-time on sufficiently powerful computing systems, processed after a delay or in batch mode, processed on multiple computer systems or parallel processing computers, or processed using any other suitable mechanism available for digital signal processing.

Software implementing suitable procedures, systems and methods can be stored in the memory of a computer system as a set of instructions to be executed. In addition, the instructions to perform procedures described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version. Alternatively, the logic could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

Figure 2:
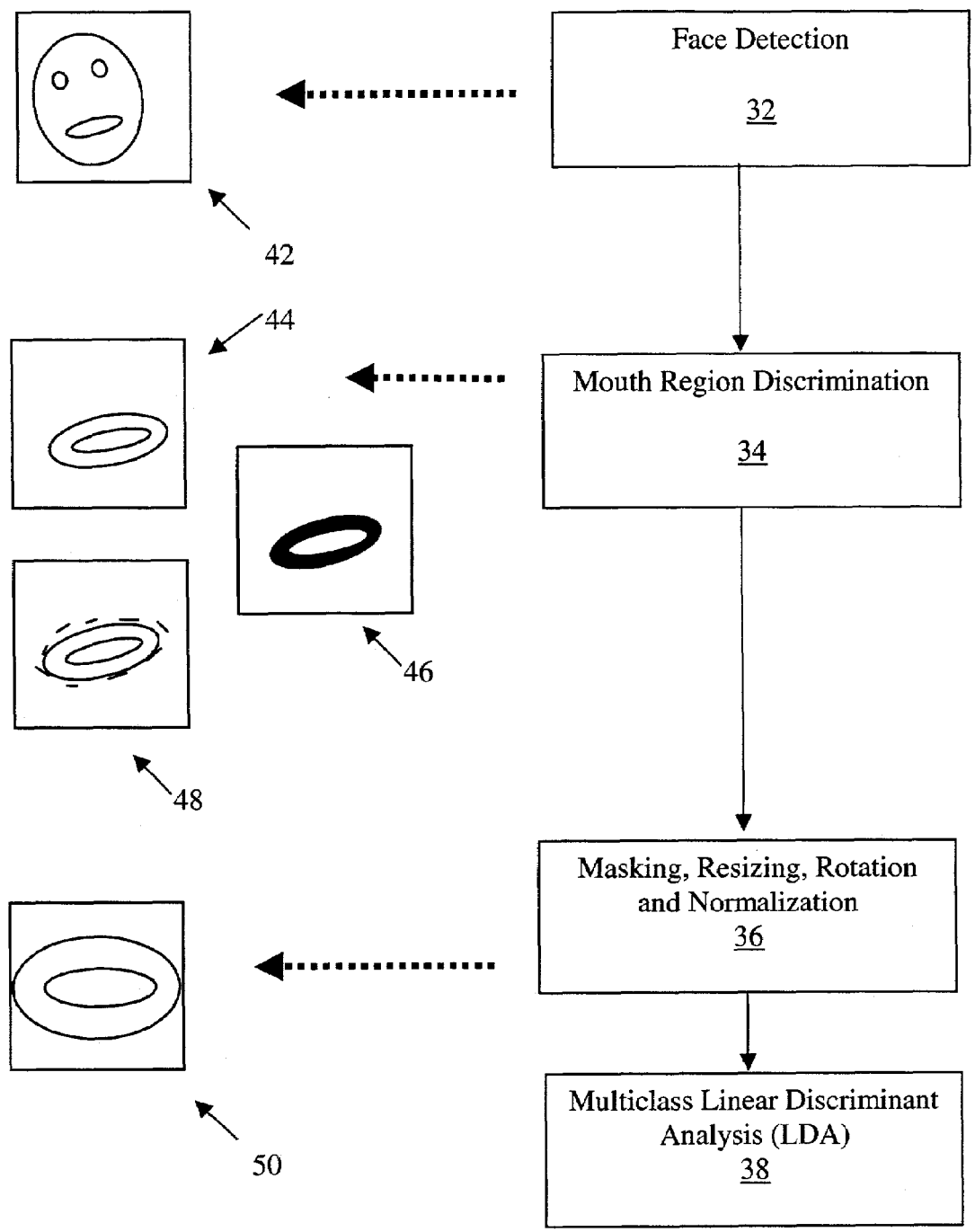
FIG. 2 illustrates a procedure for visual feature extraction, with diagrams representing feature extraction using a masked, sized and normalized mouth region.

One embodiment of a suitable visual feature extraction procedure is illustrated with respect to FIG. 2. As seen in that Figure, feature extraction 30 includes face detection 32 of the speaker's face (cartoon FIG. 42) in a video sequence. Various face detecting procedures or algorithms are suitable, including pattern matching, shape correlation, optical flow based techniques, hierarchical segmentation, or neural network based techniques. In one particular embodiment, a suitable face detection procedure requires use of a Gaussian mixture model to model the color distribution of the face region. The generated color distinguished face template, along with a background region logarithmic search to deform the template and fit it with the face optimally based on a predetermined target function, can be used to identify single or multiple faces in a visual scene.

After the face is detected, mouth region discrimination 34 is usual, since other areas of the face generally have low or minimal correlation with speech. The lower half of the detected face is a natural choice for the initial estimate of the mouth region (cartoon FIG. 44). Next, linear discriminant analysis (LDA) is used to assign the pixels in the mouth region to the lip and face classes (cartoon FIG. 46). LDA transforms the pixel values from the RGB space into an one-dimensional space that best discriminates between the two classes. The optimal linear discriminant space is computed using a set of manually segmented images of the lip and face regions.

The contour of the lips is obtained through a binary chain encoding method followed by a smoothing operation. The refined position of the mouth corners is obtained by applying the corner finding filter:

$$w(m, n) = \exp\left(-\frac{|m^2 + n^2|}{2\sigma^2}\right), \sigma^2 = 70, -3 < m, n \leq 3,$$

in a window around the left and right extremities of the lip contour. The result of the lip contour and mouth corners detection is illustrated in FIG. cartoon 48 by the dotted line around the lips and mouth.

The lip contour and position of the mouth corners are used to estimate the size and the rotation of the mouth in the image plane. Using the above estimates of the scale and rotation parameters of the mouth, masking, resizing, rotation and normalization 36 is undertaken, with a rotation and size normalized gray scale region of the mouth (typically 64×64 pixels) being obtained from each frame of the video sequence. A masking variable shape window is also applied, since not all the pixels in the mouth region have the same relevance for visual speech recognition, with the most significant information for speech recognition being contained in the pixels inside the lip contour. The masking variable shape window used to multiply the pixels values in the gray scale normalized mouth region is described as:

$$w[i, j] = \begin{cases} 1, & \text{if } i, j \text{ are inside the lip contour,} \\ 0, & \text{otherwise} \end{cases} \quad \text{(Eq. 1)}$$

Cartoon FIG. 50 in FIG. 2 illustrates the result of the rotation and size normalization and masking steps.

Next, multiclass linear discriminant analysis 38 is performed on the data. First, the normalized and masked mouth region is decomposed in eight blocks of height 32 pixels and width 16 pixels, and a two dimension discrete cosine transform (2D-DCT) is applied to each of these blocks. A set of four 2D-DCT coefficients from a window of size 2×2 in the lowest frequency in the 2D-DCT domain are extracted from each block. The resulting coefficients extracted are arranged in a vector of size 32. In the final stage of the video features extraction cascade the multi class LDA is applied to the vectors of 2D-DCT coefficients. Typically, the classes of the LDA are associated to words available in a speech database.

Figure 3:
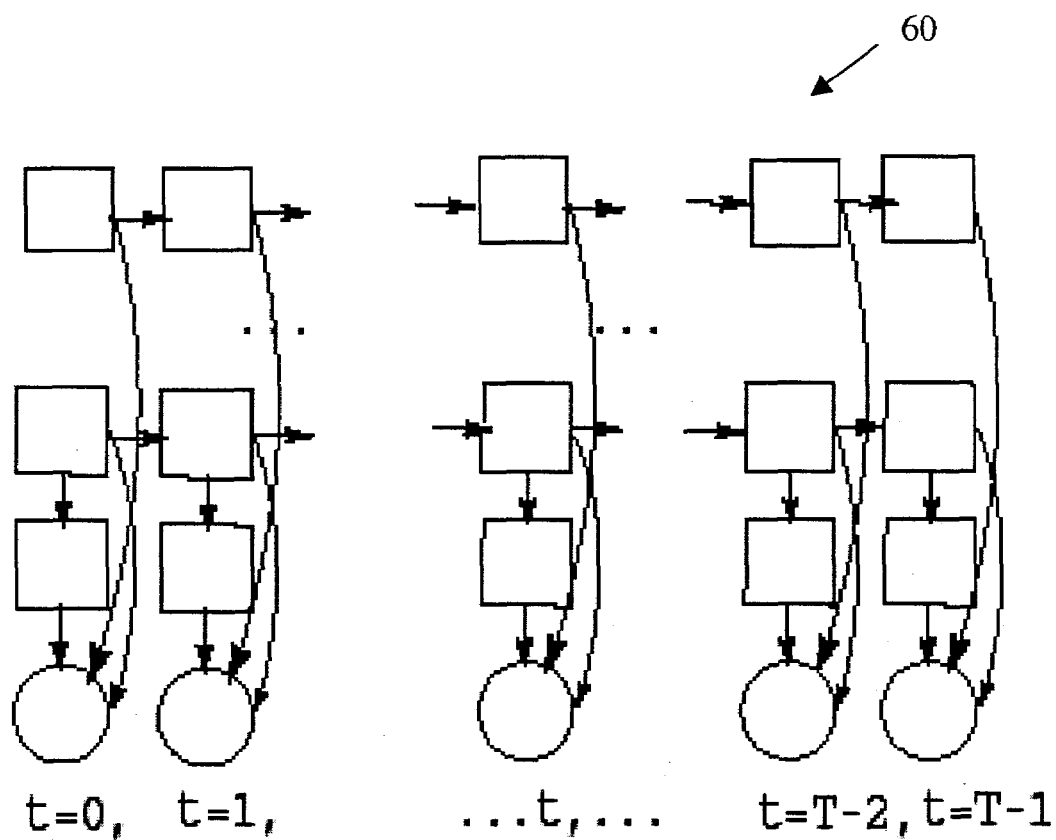
FIG. 3 schematically illustrates an audiovisual factorial HMM.

After face detection, processing, and upsampling of data to audio date rates (if necessary), the generated video data must be fused with audio data using a suitable fusion model. In one embodiment, a factorial hidden Markov model (HMM) is useful. The factorial HMM is a generalization of the HMM suitable for a large scale of multimedia applications that integrate two or more streams of data. A factorial HMM is a distributed state representation that can be seen as a collection of HMMs, one for each data stream, where the discrete nodes at time t for each HMM are conditioned by the discrete nodes at time $t_1$ of all the related HMMs. Diagram 60 in FIG. 3 illustrates a continuous mixture two-stream factorial HMM used in our audiovisual speech recognition system. The squares represent the hidden discrete nodes while the circles describe the continuous observable nodes. The hidden nodes can be conditioned temporally as coupled nodes and to the remaining hidden nodes as mixture nodes. Mathematically, the elements of the factorial HMM are described as:

$$\pi_0(i, j) = P(O_0 | q_t^0 = i, q_t^1 = j) \quad \text{(Eq. 1)}$$

$$b_t(i, j) = P(O_t | q_t^0 = i, q_t^1 = j) \quad \text{(Eq. 2)}$$

$$a_{i,k|j,l} = a_{i|k}^0 a_{j|l}^1 \quad \text{(Eq. 3)}$$

$$a_{i|j}^c = P(q_t^c = i | q_{t-1}^c = j) \text{ where } q_t^c \quad \text{(Eq. 4)}$$

is the state of the couple node in the cth stream at time t. In a continuous mixture with Gaussian components, the probabilities of the coupled nodes are given by:

$$b_t(ij) = \sum_{m=1}^{M_{ij}} w_{ij,m} N(O_t, \mu_{ij,m}, U_{ij,m}) \quad \text{(Eq. 5)}$$

where $\mu_{ij,m}$ and $U_{ij,m}$ are the mean and covariance matrix corresponding to the pair of states i, j in the coupled nodes, and mth component of the associated mixture node.

$M_{ij}$ is the number of mixtures corresponding to the pair of states of the coupled nodes and the weight $w_{ij,m}$ represents the conditional probability $$P(p_t = m | q_t^0 = i, q_t^1 = j)$$

where $p_t$ is the component of the mixture node at time t.

The constructed HMM must be trained to identify words. Maximum likelihood (ML) training of the dynamic Bayesian networks in general and of the factorial HMMs in particular, is a well understood. Any discrete time and space dynamical system governed by a hidden Markov chain emits a sequence of observable outputs with one output (observation) for each state in a trajectory of such states. From the observable sequence of outputs, the most likely dynamical system can be calculated. The result is a model for the underlying process. Alternatively, given a sequence of outputs, the most likely sequence of states can be determined. In speech recognition tasks a database of words, along with separate training set for each word can be generated.

Unfortunately, the iterative maximum likelihood estimation of the parameters only converges to a local optimum, making the choice of the initial parameters of the model a critical issue. An efficient method for the initialization of the ML must be used for good results. One such method is based on the Viterbi algorithm, which determines the optimal sequence of states for the coupled nodes of the audio and video streams that maximizes the observation likelihood. The following steps describe the Viterbi algorithm for the two stream factorial HMM used in one embodiment of the audiovisual fusion model. As will be understood, extension of this method to multi-stream factorial HMM is straightforward.

Initialization $$\delta_0(i,j) = \pi_0(i,j) b_t(i,j) \quad \text{(Eq. 6)}$$

$$\psi_0(i,j) = 0 \quad \text{(Eq. 7)}$$

Recursion $$\delta_t(i, j) = \max_{k,l} \{\delta_{t-1}(k, l) a_{i|k} a_{j|l}\} b_t(k, l) \quad \text{(Eq. 8)}$$

$$\psi_t(i, j) = \arg\max_{k,l} \{\delta_{t-1}(k, l) a_{i|k} a_{j|l}\} \quad \text{(Eq. 9)}$$

Termination $$P = \max_{i,j} \{\delta_T(i, j)\} \quad \text{(Eq. 10)}$$

$$\{q_T^a, q_T^v\} = \arg\max_{i,j} \{\delta_T(i, j)\} \quad \text{(Eq. 11)}$$

Backtracking (reconstruction)

$$\{q_t^a, q_t^v\} = \psi_{t+1}(q_{t+1}^a, q_{t+1}^v) \quad \text{(Eq. 12)}$$

The segmental K-means algorithm for the factorial HMM proceeds as follows:

Step 1—For each training observation sequence r, the data in each stream is uniformly segmented according to the number of states of the coupled nodes. An initial state sequence for the coupled nodes $$Q = q_{r,0}^{a,v}, \ldots, q_{r,t}^{a,v}, \ldots q_{r,T-1}^{a,v}$$

is obtained. For each state pair i, j of the coupled nodes the mixture segmentation of the data assigned to it obtained using the K-means algorithm with $M_{ij}$ clusters.

Consequently, the sequence of mixture components $$P = p_{0,r}, \ldots, p_{r,t}, \ldots, p_r, T-1$$

for the mixture nodes is obtained.

Step 2—The new parameters are estimated from the segmented data:

$$\mu_{i,j,m} = \frac{\sum_{r,t} \gamma_{r,t}(ij, m) O_t}{\sum_{r,t} \gamma_{r,t}(ij, m)} \quad \text{(Eq. 13)}$$

$$\sigma_{i,j,m}^2 = \frac{\sum_{r,t} \gamma_{r,t}(ij, m)(O_t - \mu_{i,j,m})(O_t - \mu_{i,j,m})^T}{\sum_{r,t} \gamma_{r,t}(ij, m)} \quad \text{(Eq. 14)}$$

$$w_{i,j,m} = \frac{\sum_{r,t} \gamma_{r,t}(ij, m)}{\sum_{r,t} \sum_m \gamma_{r,t}(ij, m)} \quad \text{(Eq. 15)}$$

$$a_{i|k}^{a,v} = \frac{\sum_{r,t} \epsilon_{r,t}^{a,v}(i, k)}{\sum_{r,t} \sum_k \sum_l \epsilon_{r,t}^{a,v}(i, k)} \quad \text{and where} \quad \text{(Eq. 16)}$$

$$\gamma_{r,t}^{a,v}(ij, m) = \begin{cases} 1, & \text{if } q_{r,t}^a = i, q_{r,t}^v = j, p_{r,t} = m, \\ 0, & \text{otherwise} \end{cases} \quad \text{(Eq. 17)}$$

$$\epsilon_{r,t}^{a,v}(i, k) = \begin{cases} 1, & \text{if } q_{r,t}^{a,v} = i, q_{r,t-1}^{a,v} = k \\ 0, & \text{otherwise} \end{cases} \quad \text{(Eq. 18)}$$

Step 3—At consecutive iterations an optimal sequence Q of the coupled nodes are obtained using the Viterbi algorithm (which includes Equations 7 through 12). The sequence of mixture component P is obtained by selecting at each moment T the mixture $$p_{r,t} = \max_{m=1,\ldots,M_{ij}} P(O_t | q_{r,t}^a = i, q_{r,t}^v = j, m) \quad \text{(Eq. 19)}$$

Step 4—The iterations in steps 2 through 4 inclusive are repeated until the difference between observation probabilities of the training sequences falls below the convergence threshold.

Word recognition is carried out via the computation of the Viterbi algorithm (Equations 7–12) for the parameters of all the word models in the database. The parameters of the factorial HMM corresponding to each word in the database are obtained in the training stage using clean audio signals (SNR=30 db). In the recognition stage the input of the audio and visual streams is weighted based on the relative reliability of the audio and visual features for different levels of the acoustic noise. Formally the state probability at time t for an observation vector $O_t$ becomes $$\tilde{b}_t(i, j) = P(O_t^a|q_t^a = i)^{\alpha_a} P(O_t^v|q_t^v = i)^{\alpha_v} \quad \text{(Eq. 20)}$$

where $\alpha_a + \alpha_v = 1$ and $\alpha_a, \alpha_v \geq 0$ are the exponents of the audio and video streams. The values of $\alpha_a, \alpha_v$ corresponding to a specific signal to noise ratio (SNR) are obtained experimentally to maximize the average recognition rate. In one embodiment of the system, audio exponents were optimally found to be

| SNR(db) | 30 | 28 | 26 | 24 | 22 | 20 | 18 | 16 | 14 | 12 | 10 |
|---|---|---|---|---|---|---|---|---|---|---|---|
| $\alpha_a$ | 0.7 | 0.5 | 0.5 | 0.5 | 0.4 | 0.4 | 0.2 | 0.2 | 0.2 | 0.1 | 0.1 |

Figure 4:
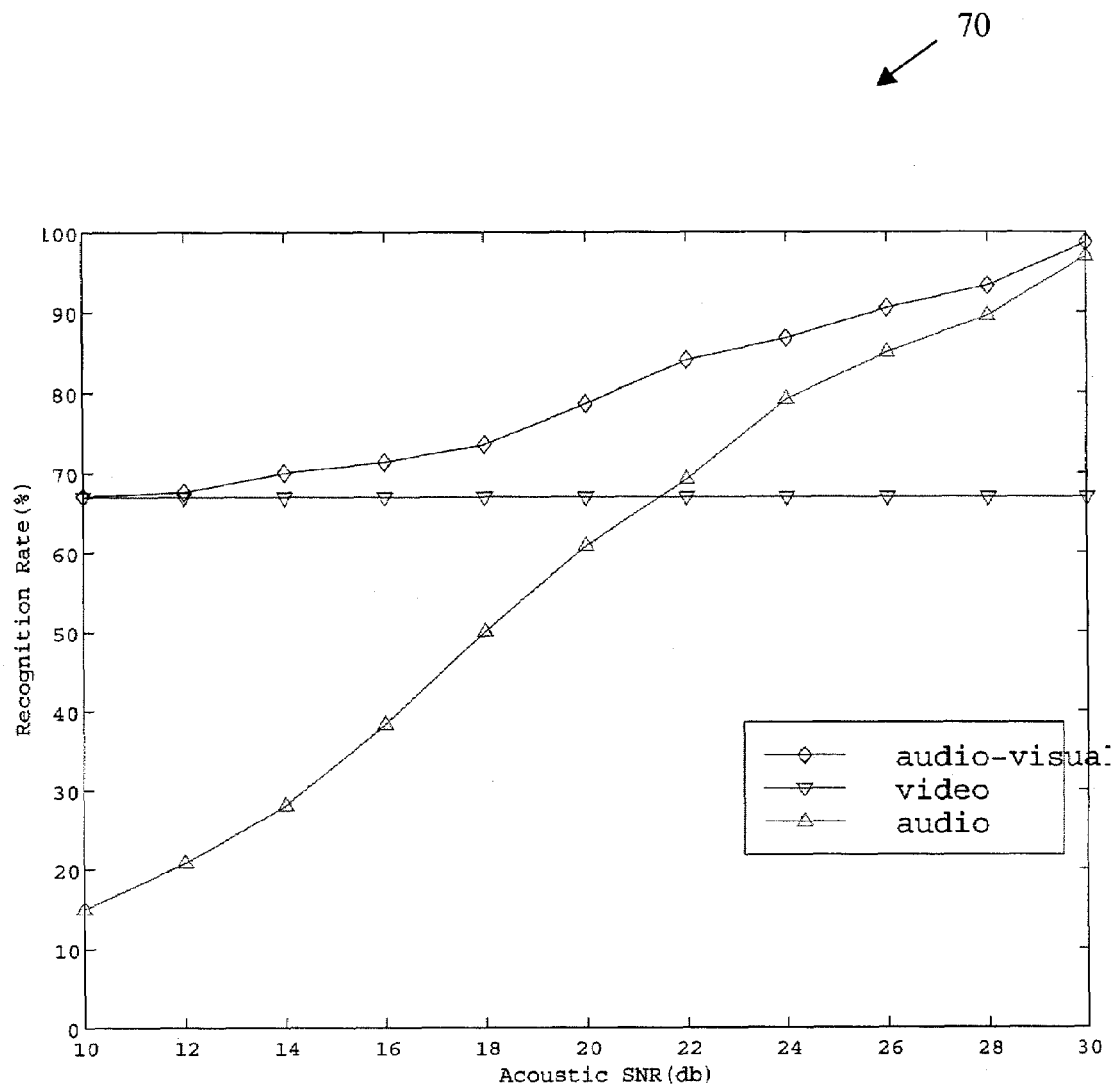
FIG. 4 illustrates recognition rate using a factorial HMM model.

Experimental results for speaker dependent audiovisual word recognition system on 36 words in a database have been determined. Each word in the database is repeated ten times by each of the ten speakers in the database. For each speaker, nine examples of each word were used for training and the remaining example was used for testing. Audio-only, video-only and audiovisual recognition rates using a factorial HMM are presented graphically in chart 70 of FIG. 4 and the table below. In chart 70, the inverted triangle data point represents a visual HMM, the triangle data point represents an audio HMM, and the diamond shaped data point illustrates an audiovisual factorial HMM.

| SNR(db) | 30 | 28 | 26 | 24 | 22 | 20 | 18 | 16 | 14 | 12 | 10 |
|---|---|---|---|---|---|---|---|---|---|---|---|
| V HMM (%) | 66.94 | 66.94 | 66.94 | 66.94 | 66.94 | 66.94 | 66.94 | 66.94 | 66.94 | 66.94 | 66.94 |
| A HMM (%) | 96.94 | 89.53 | 84.99 | 79.16 | 69.16 | 60.83 | 49.99 | 38.32 | 28.05 | 20.79 | 14.99 |
| AV FHMM (%) | 98.64 | 93.24 | 90.54 | 86.75 | 84.05 | 78.64 | 73.51 | 71.35 | 70.00 | 67.56 | 67.02 |

As can be seen from inspection of the chart 70 and the above table, for audio-only speech recognition the acoustic observation vectors (13 MFCC coefficients extracted from a window of 20 ms) are modeled using a HAM with the same characteristics as the one described for video-only recognition. For the audio-video recognition, a factorial HMM with states for the coupled nodes in both audio and video streams, no back transitions, and three mixture per state, is used. The experimental results indicate that the factorial HMM-based audiovisual speech recognition rate increases by 45% the audio-only speech recognition at SNR of 16 db.

As will be appreciated, accurate audiovisual data to text processing can be used to enable various applications, including provision of robust framework for systems involving human computer interaction and robotics. Accurate speech recognition in high noise environments allows continuous speech recognition under uncontrolled environments, speech command and control devices such as hand free telephones, and other mobile devices. In addition the factorial HMM can be applied to a large number of multimedia applications that involve two or more related data streams such as speech, one or two hand gesture and facial expressions. In contrast to a conventional HMM, the factorial HMM can be readily configured to take advantage of the parallel computing, with separate modeling/training data streams under control of separate processors.

As will be understood, reference in this specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims, including any amendments thereto, that define the scope of the invention.

What is claimed is:

1. A speech recognition method for audiovisual data comprising
    obtaining a first data stream of speech data and a second data stream of face image data while a speaker is speaking;
    extracting visual features from the second data stream by masking, resizing, rotating, and normalizing a mouth region in a face image, and by using a two-dimensional discrete cosine transform;
    constructing a factorial hidden Markov model for the first data stream and the second data stream, the factorial hidden Markov model including a plurality of hidden Markov models with each hidden Markov model having a plurality of discrete nodes and continuous observable nodes, wherein discrete nodes at a first time for each hidden Markov model are conditioned by discrete nodes at a second time of the plurality of hidden Markov models; and
    providing maximum likelihood training for the factorial hidden Markov model to identify words.

2. The method of claim 1, further comprising maximum likelihood initialization using a Viterbi algorithm.

3. The method of claim 1, wherein the first data stream and the second data stream each corresponds to one of the plurality of hidden Markov models.

4. The method of claim 3, wherein the first data stream and the second data stream are asynchronous.

5. The method of claim 1, further comprising using a Viterbi algorithm to determine optimal sequence of states for the coupled nodes of the the first and the second streams that maximizes the observation likelihood during maximum likelihood training.

6. A speech recognition method comprising
using an audio and a video data set that respectively provide a first data stream of speech data and a second data stream of face image data,
extracting visual features from the second data stream by masking, resizing, rotating, and normalizing a mouth region in a face image, and by using a two-dimensional discrete cosine transform, and
applying a two stream factorial hidden Markov model ("HMM") to the first and second data streams for speech recognition, the factorial HMM including two HMMs with one corresponding to the first data stream and the other corresponding to the second data stream, each HMM having a plurality of discrete nodes and continuous observable nodes, wherein discrete nodes at a first time for each HMM are conditioned by discrete nodes at a second time of the two HMMs.

7. The method of claim 6, wherein the audio and video data sets providing the first and second data streams are asynchronous.

8. The method of claim 6, further comprising parallel processing of the first and second data streams.

9. The method of claim 6, further comprising training of the two stream factorial hidden Markov model using a Viterbi algorithm.

10. An article comprising a computer readable medium to store computer executable instructions, the instructions defined to cause a computer to
use an audio and a video data set that respectively provide a first data stream of speech data and a second data stream of face image data
extract visual features from the second data stream by masking, resizing, rotating, and normalizing a mouth region in a face image, and by using a two-dimensional discrete cosine transform, and
apply a two stream factorial hidden Markov model ("HMM") to the first and second data streams for speech recognition, the factorial HMM including two HMMs with one corresponding to the first data stream and the other corresponding to the second data stream, each HMM having a plurality of discrete nodes and continuous observable nodes, wherein discrete nodes at a first time for each HMM are conditioned by discrete nodes at a second time of the two HMMs.

11. The article comprising a computer readable medium to store computer executable instructions of claim 10, wherein the instructions further cause a computer to process asynchronous first and second data streams.

12. The article comprising a computer readable medium to store computer executable instructions of claim 10, wherein the instructions further cause a computer to parallel process the first and second data streams.

13. The article comprising a computer readable medium to store computer executable instructions of claim 10, wherein the instructions further cause a computer to train the two stream factorial hidden Markov model using a Viterbi algorithm.

14. A speech recognition system comprising
an audiovisual capture module to capture an audio and a video data set that respectively provide a first data stream of speech data and a second data stream of face image data,
a feature extraction module to extract visual features from the second data stream by masking, resizing, rotating, and normalizing a mouth region in a face image, and by using a two-dimensional discrete cosine transform, and
a speech recognition module that applies a two stream factorial hidden Markov model ("HMM") to the first and second data streams for speech recognition, the factorial HMM including two HMMs with one corresponding to the first data stream and the other corresponding to the second data stream, each HMM having a plurality of discrete nodes and continuous observable nodes, wherein discrete nodes at a first time for each HMM are conditioned by discrete nodes at a second time of the two HMMs.

15. The speech recognition system of claim 14, further comprising asynchronous audio and video data sets.

16. The speech recognition system of claim 14, wherein the speech recognition module processes the first and second data streams in parallel.

17. The speech recognition system of claim 14, wherein the speech recognition module trains the two stream factorial hidden Markov model using a Viterbi algorithm.

* * * * *